(12) United States Patent
Porter et al.

(10) Patent No.: US 7,726,703 B2
(45) Date of Patent: Jun. 1, 2010

(54) DEFORMABLE PIPE COUPLING HAVING MULTIPLE RADII OF CURVATURE

(75) Inventors: Michael V. Porter, Easton, PA (US); Craig Haney, Nazareth, PA (US); Scott D. Madara, Nazareth, PA (US); Douglas R. Dole, Whitehouse Station, NJ (US); John W. Pierce, Nazareth, PA (US)

(73) Assignee: Victaulic Company, Easton, PA (US)

( * ) Notice: Subject to any disclaimer, the term of this patent is extended or adjusted under 35 U.S.C. 154(b) by 1029 days.

(21) Appl. No.: 11/448,405

(22) Filed: Jun. 7, 2006

(65) Prior Publication Data

US 2008/0048444 A1    Feb. 28, 2008

(51) Int. Cl.
*F16L 25/00* (2006.01)
(52) U.S. Cl. .................. 285/420; 285/411; 285/367; 285/364
(58) Field of Classification Search .......... 285/382, 285/382.7, 411, 364, 420, 110, 111, 112, 285/367; 29/282
See application file for complete search history.

(56) References Cited

U.S. PATENT DOCUMENTS

| | | | | |
|---|---|---|---|---|
| 1,930,194 | A | | 10/1933 | Dillon ........................ 285/104 |
| 2,369,770 | A | | 2/1945 | Baxter ........................ 285/104 |
| 2,439,979 | A | | 4/1948 | Krooss ........................ 285/419 |
| 2,449,795 | A | | 9/1948 | Stillwagon ................... 285/104 |
| 3,107,108 | A | * | 10/1963 | Greene ........................ 285/341 |
| 4,522,434 | A | | 6/1985 | Webb ........................ 285/112 |
| 4,893,843 | A | | 1/1990 | DeRaymond ................ 277/616 |
| 5,845,384 | A | * | 12/1998 | Retzbach ..................... 29/450 |
| 6,170,884 | B1 | | 1/2001 | McLennan et al. .......... 285/112 |
| 6,302,450 | B1 | * | 10/2001 | Dole et al. ................... 285/328 |
| 2005/0253380 | A1 | * | 11/2005 | Gibb et al. ................... 285/111 |
| 2005/0258641 | A1 | | 11/2005 | Gibb .......................... 285/112 |
| 2007/0090646 | A1 | * | 4/2007 | Dole et al. ................... 285/413 |

FOREIGN PATENT DOCUMENTS

EP    79457 A1 *   5/1983

OTHER PUBLICATIONS

"Notification of Transmittal of the International Search Report and the Written Opinion of the International Searching Authority, or the Declaration" dated Jul. 18, 2008 (11 pages).

* cited by examiner

*Primary Examiner*—Daniel P Stodola
*Assistant Examiner*—Robert Williams
(74) *Attorney, Agent, or Firm*—Ballard Spahr LLP

(57) ABSTRACT

A pipe coupling for joining pipe elements end-to-end is disclosed. The pipe coupling is formed of segments attached to one another circumferentially straddling the pipe elements. The segments are formed from sub-sections connected to one another end-to-end. Each sub-section has a surface region disposed to engage the outer surfaces of the pipe elements. Each surface region has a different radius of curvature from a surface region on a neighboring sub-section. The radii are selected so that when the coupling segments are deformed around the pipe elements, portions of surface regions of selected sub-sections contact the pipe elements, while portions of surface regions of those sub-sections between the selected portions remain in spaced relation away from the pipe elements. A constant and minimal torque is required to bolt the segments together as a result.

20 Claims, 7 Drawing Sheets

DEFORMABLE PIPE COUPLING HAVING MULTIPLE RADII OF CURVATURE

FIELD OF THE INVENTION

The invention relates to mechanical pipe couplings for securing pipe elements to one another end-to-end.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surface regions which are disposed to engage plain end pipe elements or circumferential grooves that extend around each of the pipe elements to be joined. Engagement between the surface regions and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another and engage the surface regions with the outer surfaces of the pipe elements.

To ensure a good fit between the couplings and the pipe elements, the surface regions on prior art couplings have a single radius of curvature that is substantially matched to the radius of curvature of the outer surface of the pipe element that it is intended to engage. For couplings used with grooved pipe elements, the radii of curvature of the surface regions are smaller than the radii of curvature of the outer surfaces of the pipe elements outside of the grooves so that the surface regions fit within and engage the grooves properly.

This geometrical relation between the surface regions of the coupling segments and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the surface regions are aligned with the grooves, the bolts are inserted through the lugs, the nuts are threaded onto the bolts and tightened, drawing the coupling segments toward one another, compressing the seal and engaging the surface regions within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece-by-piece.

Furthermore, there is a class of pipe coupling segments wherein the surface regions have a larger radius of curvature than the pipe elements. When these coupling segments are initially positioned straddling the pipe ends, their surface regions initially contact pipe ends at a point about midway between opposite ends of each coupling segment. The surface regions near the ends of the segments are in spaced relation to the pipe element surface. When the fasteners are tightened, these coupling segments deform, and the surface regions on each segment progressively engage the outer surfaces of the pipe elements outwardly from the midpoint to each opposite end. Tightening the fasteners bends the coupling segments around the pipe ends by applying a bending moment. The moment arm of this bending moment extends between the leading edge of the surface region that is in contact with the pipe element on one side of the coupling segment, and the fastener on that one side. Initially the moment arm extends between the midpoint of the coupling segment and the fastener. As the surface region in contact with the pipe element grows progressively larger, the leading edge of this surface region moves from the midpoint of the segment toward the fastener. Consequently, the moment arm between leading edge and the fastener decreases, and the tension force in the fasteners required to deform the coupling segments increases as the coupling segments deform. The torque required to tighten the fasteners increases as a result. For large diameter couplings the required torque can exceed reasonable levels, causing difficulty for coupling of pipes using hand tools. It would be advantageous to have a deformable pipe coupling wherein the torque required to tighten the fastener and deform the coupling does not increase significantly as the coupling is deformed into contact with the pipe elements.

SUMMARY OF THE INVENTION

The invention concerns interconnectable pipe coupling segments, each positionable for straddling facing ends of a pair of pipe elements for securing the pipe elements together in end-to-end relationship. The ends of the pipe elements have an outer surface of substantially cylindrical profile.

A coupling segment according to the invention comprises a plurality of sub-sections attached to one another end-to-end. Each of the sub-sections has a surface region of a different radius of curvature from an adjacent sub-section. The surface regions are disposed to interface circumferentially with the outer surfaces of the pipe elements. The segment also has connection members positioned at opposite ends for adjustably connecting the coupling segments to one another. The connection members are adjustably tightenable for drawing the coupling segments toward one another. The coupling segments are deformable upon adjustable tightening of one or more of the connection members so as to engage the surface regions with the outer surfaces of the pipe elements at a first contact point located about midway between the opposite ends of the coupling segments, and at second and third contact points located at the opposite ends of the coupling segment.

In one embodiment, the surface region on one of the sub-sections has an infinite radius of curvature. In another embodiment, the one sub-section is positioned at a midpoint between the opposite ends of the coupling segment.

The surface regions may be symmetrically disposed about the midpoint of the coupling segment. It is also feasible that each of the surface regions has a radius of curvature that is smaller in proportion to distance from the midpoint.

The connection members may project outwardly from the opposite ends of each of the coupling segments. The connection members are adapted to receive fasteners adjustably joining the connection members to one another. The fasteners are adjustably tightenable for drawing the surface regions of the sub-sections into engagement with the outer surfaces of the pipe elements.

The surface regions on at least one of the coupling segments, taken together, subtend a total angle of less than 180°, and each of the sub-sections having a radius of curvature greater than the radius of curvature of the outer surfaces of the pipe elements.

In another embodiment, the surface region located midway between the opposite ends of at least one of the coupling segments projects radially inwardly.

The invention also includes a coupling assembly formed of a plurality of coupling segments as described above, as well as a combination of a pipe coupling assembly and a pair of pipe elements secured end-to-end relationship, the coupling assembly comprising pipe coupling segments as described above.

Another embodiment of the invention comprises a pipe coupling having first and second sub-sections attached to one another end-to-end. Each of the sub-sections has a surface region with a radius of curvature. The first and second sub-sections intersect at a point midway between opposite ends of the coupling segment. The surface regions form a cusp at their intersection projecting radially inwardly. The surface regions are disposed to interface circumferentially with the outer surfaces of said pipe elements.

The invention further includes a method of securing facing end portions of pipe elements together in end-to-end relationship. As noted above, the end portions of the pipe elements have an outer surface of substantially cylindrical profile. The method comprises:

(a) providing a pipe coupling assembly having a pair of coupling segments attached to one another end-to-end surrounding a central space, the coupling segments having surface regions disposed to interface circumferentially with the outer surfaces of the pipes;
(b) inserting the end portions of the pipe elements into the central space;
(c) moving the coupling segments toward one another so as to first engage the surface regions of the coupling segments with the outer surfaces of the pipe elements at a first contact point located between opposite ends of the coupling segments; and
(d) deforming the coupling segments so as to next engage second and third surface regions, positioned at the opposite ends of the coupling segments, with the outer surfaces of the pipe elements.

The method may further include deforming the coupling segments so as to engage surface regions intermediate the first and second contact points and intermediate the first and third contact points with the outer surfaces of the pipe elements.

Another aspect of the invention includes a method of designing a coupling segment, the method comprising:

(a) creating a mathematical model of the segment, the model having a first undeformed shape;
(b) deforming the model to a first deformed shape;
(c) modifying the model so that the first deformed shape becomes a second undeformed shape;
(d) deforming the model so that first and second points thereon coincide with a curve representing an outer surface of a pipe elements; and
(e) adjusting the position of a plurality of third points on the model between the first and second points so that the third points are positioned in spaced relation away from the curve.

DETAILED DESCRIPTION OF THE EMBODIMENTS

Figures 1, 1A:
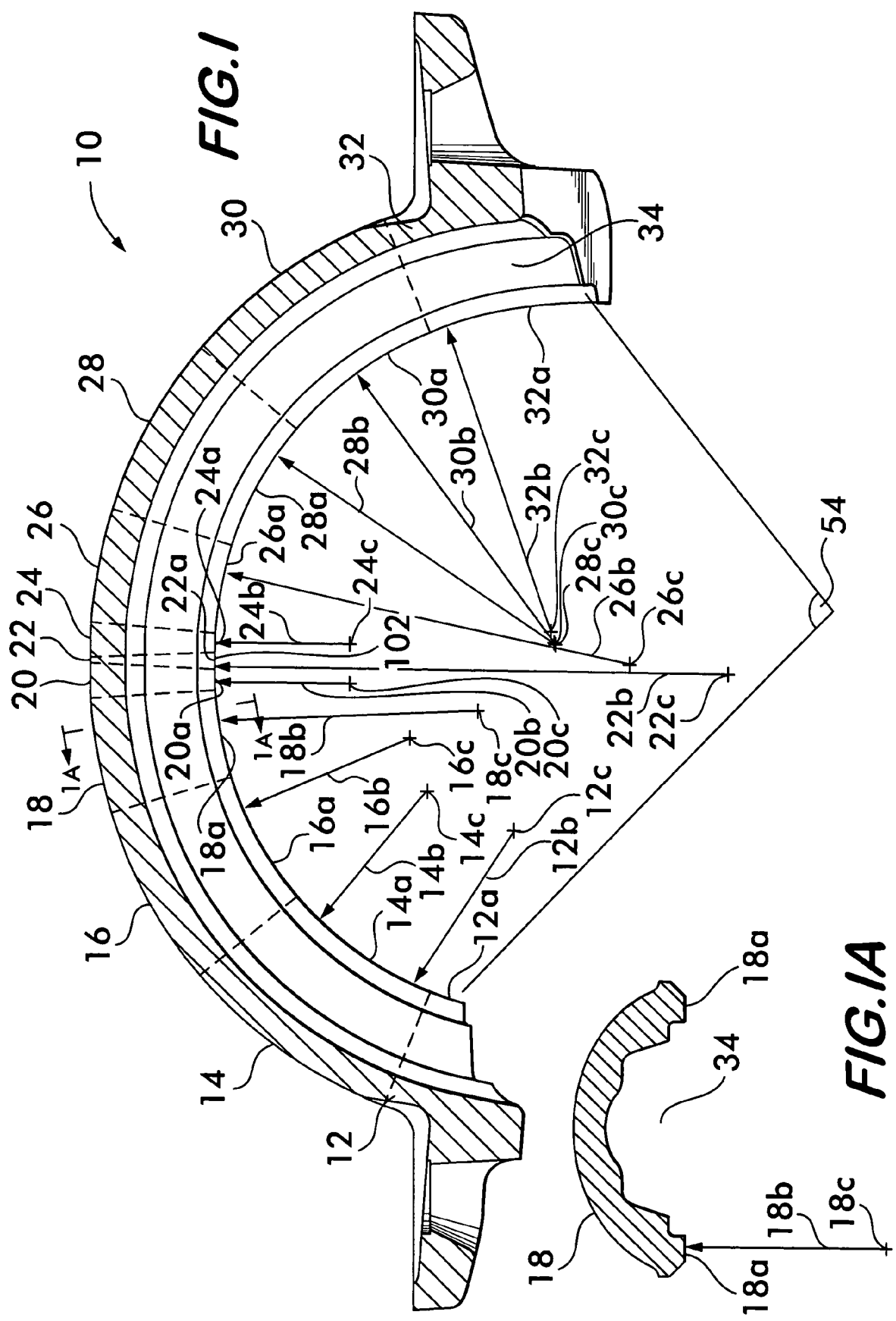
FIG. 1 is a cross-sectional view of a pipe coupling segment according to the invention.
FIG. 1A is a cross-sectional view taken at line 1A-1A of FIG. 1.

FIG. 1 shows a pipe coupling segment 10 according to the invention. Coupling segment 10 is formed of a plurality of sub-sections, in this example, eleven sub-sections numbered 12-32 attached to one another end-to-end. Borders between the subsections are denoted for clarity of illustration by broken lines. Each sub-section has a surface region, numbered 12a-32a respectively, the surface regions being disposed so as to interface circumferentially with the outer surfaces of a pipe element for joining pipe elements in end-to-end relation as described in detail below.

Each surface region has a different radius of curvature from an adjacent surface region on an adjacent sub-section. The radii of curvature for the surface regions are respectively numbered 12b-32b. As a mathematical consequence, each surface region also has a different center of curvature from a surface region on an adjacent sub-section, the centers of curvature being numbered 12c-32c.

In one embodiment, the surface region 22a of sub-section 22, which is positioned approximately midway between opposite ends of the segment 10, has an infinite radius of curvature, i.e., the surface region 22a is substantially flat, the remaining surface regions being arcuate.

Figure 4:
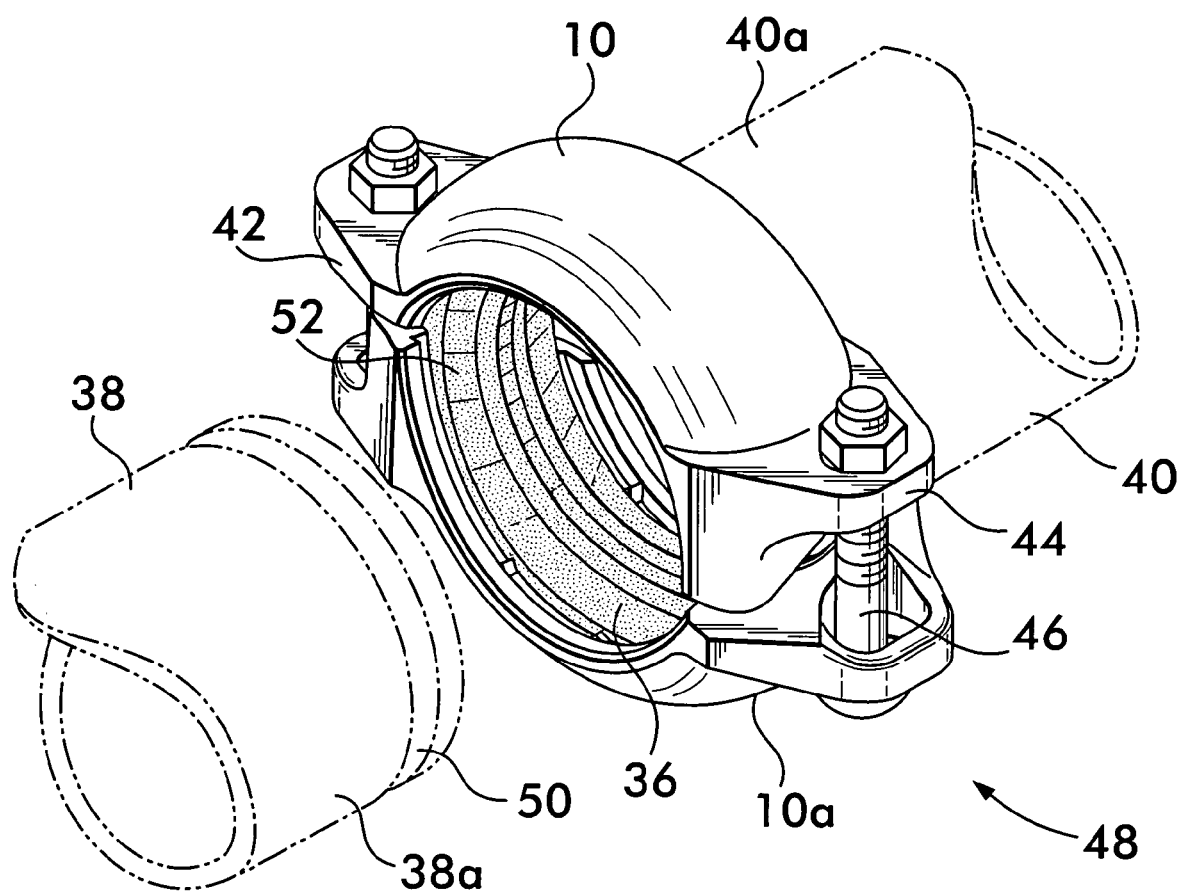
FIG. 4 is a perspective view of a pipe coupling assembly according to the invention.

As shown in FIG. 1A using sub-section 18 by way of example, the sub-sections 12-32 preferably have a concave cross section and form a channel 34 circumferentially disposed about the segment 10. Channel 34 is sized to receive a seal 36, shown in FIG. 4, for providing a fluid-tight joint between the pipe elements 38 and 40 joined in end-to-end relation. Connection members, preferably in the form of outwardly projecting lugs 42 and 44, are positioned at opposite ends of segment 10. The connection members include fasteners 46, which join a plurality of coupling segments, for example, 10 and 10a together to form a coupling assembly 48. Fasteners 46 are adjustably tightenable for drawing the coupling segments 10 and 10a toward one another to bring portions of certain ones of the surface regions 12a-32a into engagement with the respective outer surfaces 38a and 40a of pipe elements 38 and 40 and effect the joint therebetween. The pipe element outer surfaces 38a and 40a are of substantially cylindrical profile and may be plain, flared, have a retaining shoulder, or a circumferential groove 50 as shown. When the groove 50 is present, the outer surface of the pipe element is included, at least in part, within the groove, and the certain surface regions that engage the outer surface of the pipe elements engage those surfaces within these grooves.

In one embodiment, shown in FIG. 1, the radii of curvature 12b-32b of the surface regions 12a-32a are greater than the radius of curvature of the pipe elements 38 and 40 such that, when the coupling segments 10 are held in spaced relation from one another in the assembly 48, the pipe elements may be inserted within the central space 52 defined between the coupling segments. This feature eliminates the need to disassemble the coupling assembly in order to engage the segments 10 with the pipe elements. The segments may be held apart, for example, by the seal 36 which has an outer diameter sized appropriately to support the segments in the required spaced relation as described in U.S. patent application Ser. No. 11/128,728, hereby incorporated by reference herein. Other embodiments may employ spacers or springs between the lugs as described in U.S. application Ser. No. 11/125,430, hereby incorporated by reference herein. Additionally, the segment 10 may be notched at each end to provide clearance as disclosed in U.S. patent application Ser. No. 11/125,739, hereby incorporated by reference herein. As explained below, when the radii of curvature of the segments are greater than the radius of curvature of the pipe elements, it is advantageous that the surface regions, when taken together, subtend a total angle 54 (see FIG. 1) of less than 180°. This configuration is described in U.S. application Ser. No. 11/124,781, hereby incorporated by reference herein.

Figure 2:
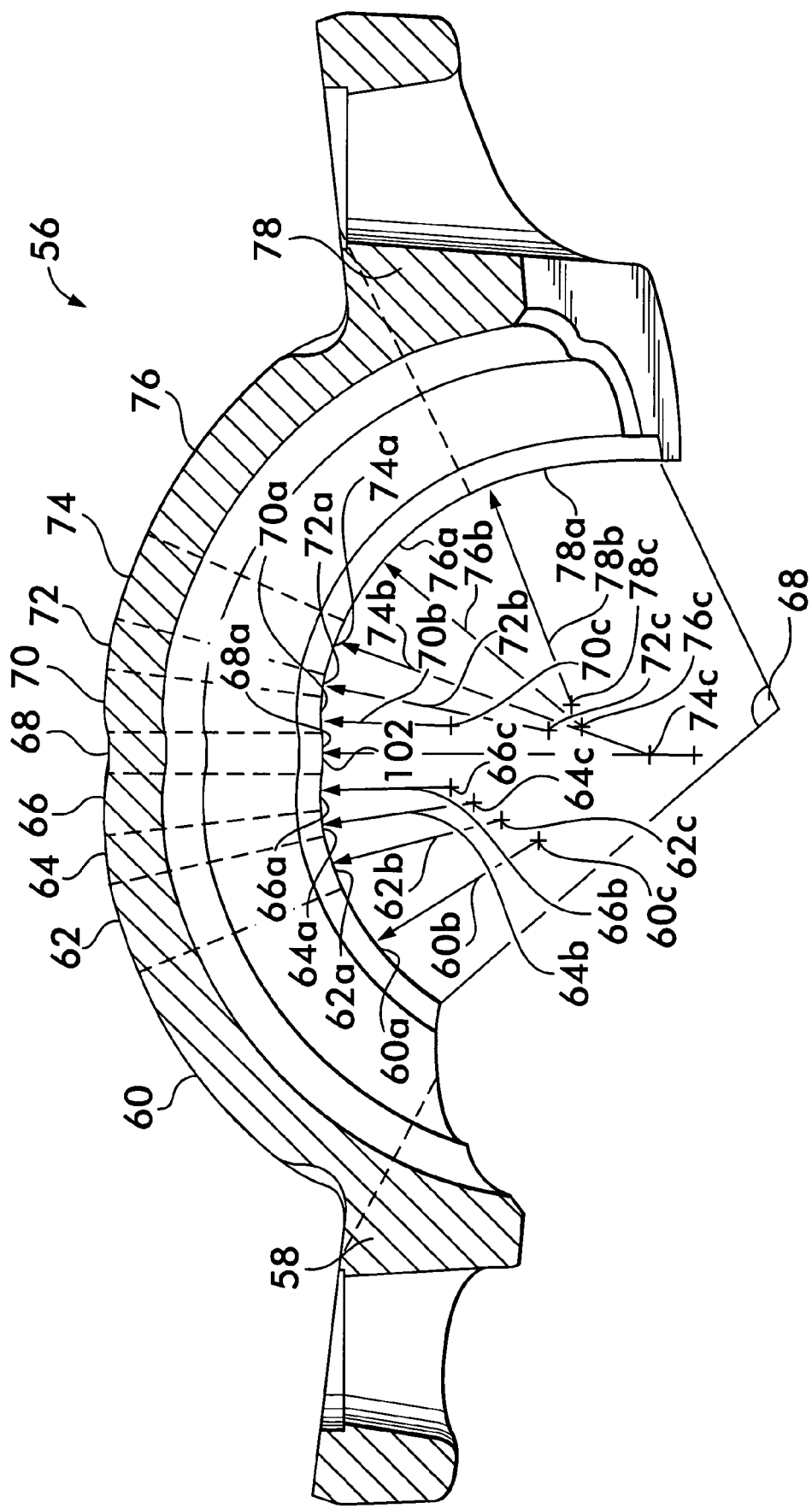
FIG. 2 is a cross-sectional view of another embodiment of a pipe coupling segment according to the invention.

FIG. 2 shows a coupling segment embodiment 56 that, like the segment described previously, is formed of a plurality of sub-sections 60-78 attached to one another end-to-end. Each sub-section has a surface region, the surface regions being numbered 60a-78a, each surface region having a different radius of curvature (60b-78b) from an adjacent surface region as well as a different center of curvature (60c-78c). Unlike the embodiment shown in segment 10, segment embodiment 56 also includes a subsection 68, preferably positioned about midway between the ends of the segment wherein the surface region 68a projects radially inwardly. This surface region may also be substantially flat or planar, whereas the remaining surface regions are arcuate. Both the inwardly projecting and the planar characteristics of the sub-section enhance the desired behavior of the coupling upon installation as described below.

Figure 3:
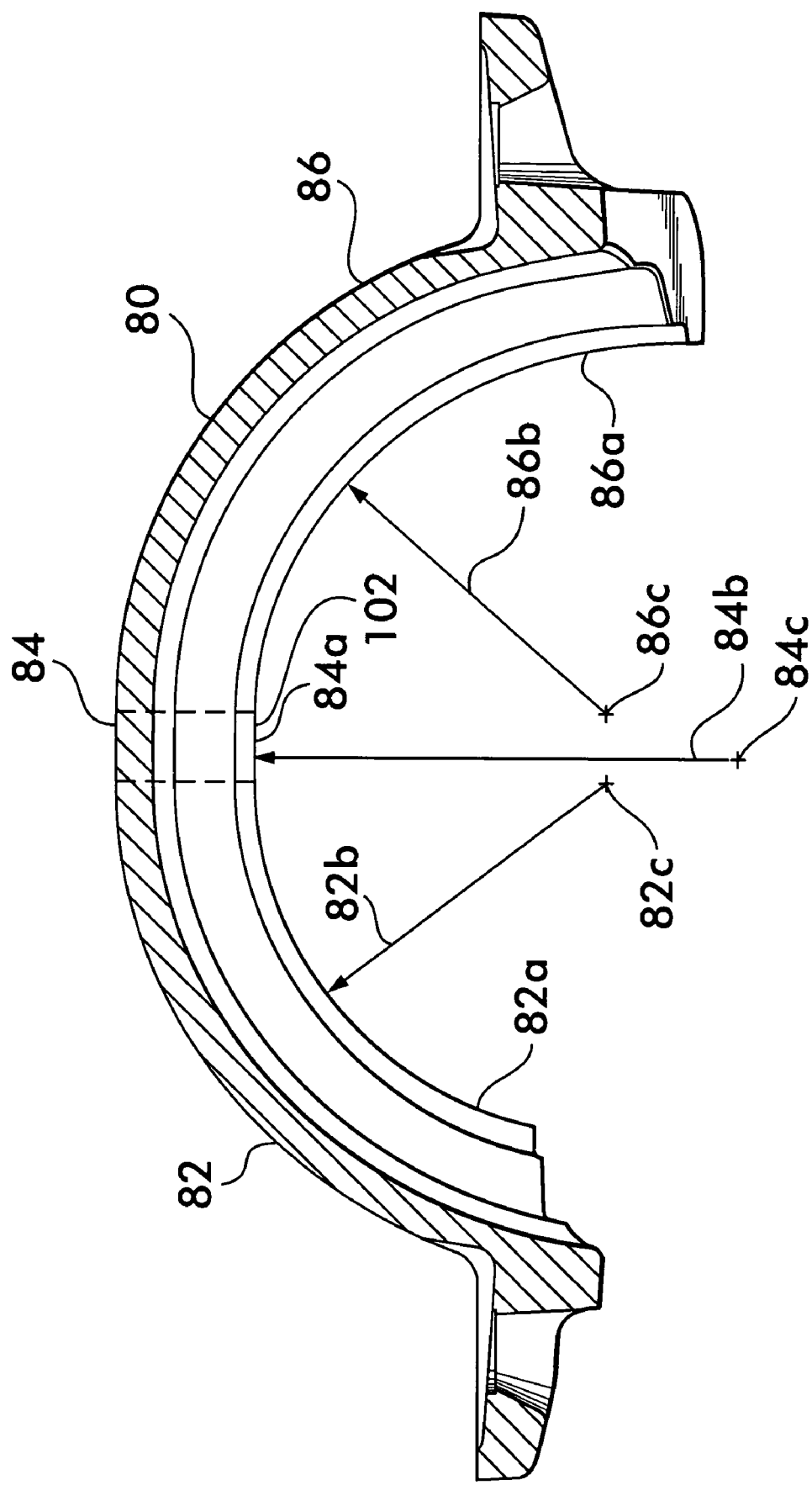
FIGS. 3, 3A and 3B are cross-sectional views of other embodiments of a pipe coupling segment according to the invention.

In another embodiment, shown in FIG. 3, the segment 80 is formed of three sub-sections 82, 84 and 86 attached to one another end-to-end. The sub-section each have respective surface regions 82a, 84a and 86a with different respective radii of curvature 82b, 84b and 86b having different centers of curvature 82c, 84c and 86c. In this example embodiment, the surface region 84a of sub-section 84 has the largest radius of curvature, which may even be infinite, indicating a flat surface region as depicted. The other sub-sections 82 and 86 are arcuate, and their radii of curvature 82b and 86b may be equal to one another, making the segment 80 substantially symmetrical about the center sub-section 84 with respect to the radii of curvature of the sub-sections.

Figure 3A:
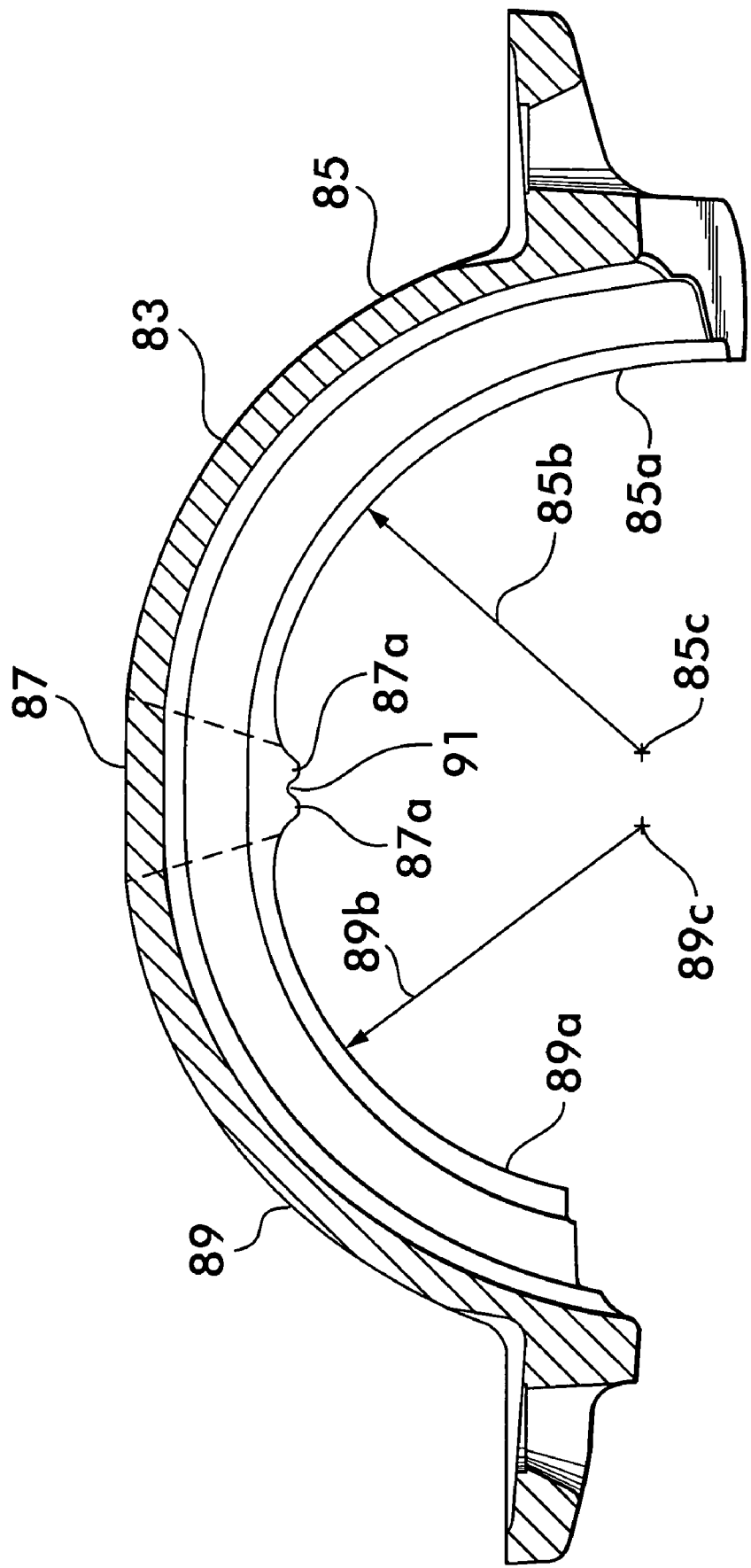

FIG. 3A illustrates another coupling segment 83 comprising three sub-sections 85, 87 and 89 attached to one another end to end. Sub-sections 85 and 89 have respective surface regions 85a and 89a with respective radii of curvature 85b and 89b and centers of curvature 85c and 89c. The center sub-section 87 has a pair of surface regions 87a and 87a' that are approximately located on opposite sides of the midpoint 91 between opposite ends of the coupling segment. The pair of surface regions 87a and 87a' project radially inwardly to first engage the pipe surface when segments 83 are used to create a joint as described below. The pair of region provides stability to the coupling assembly upon engagement with pipe elements.

Figure 3B:
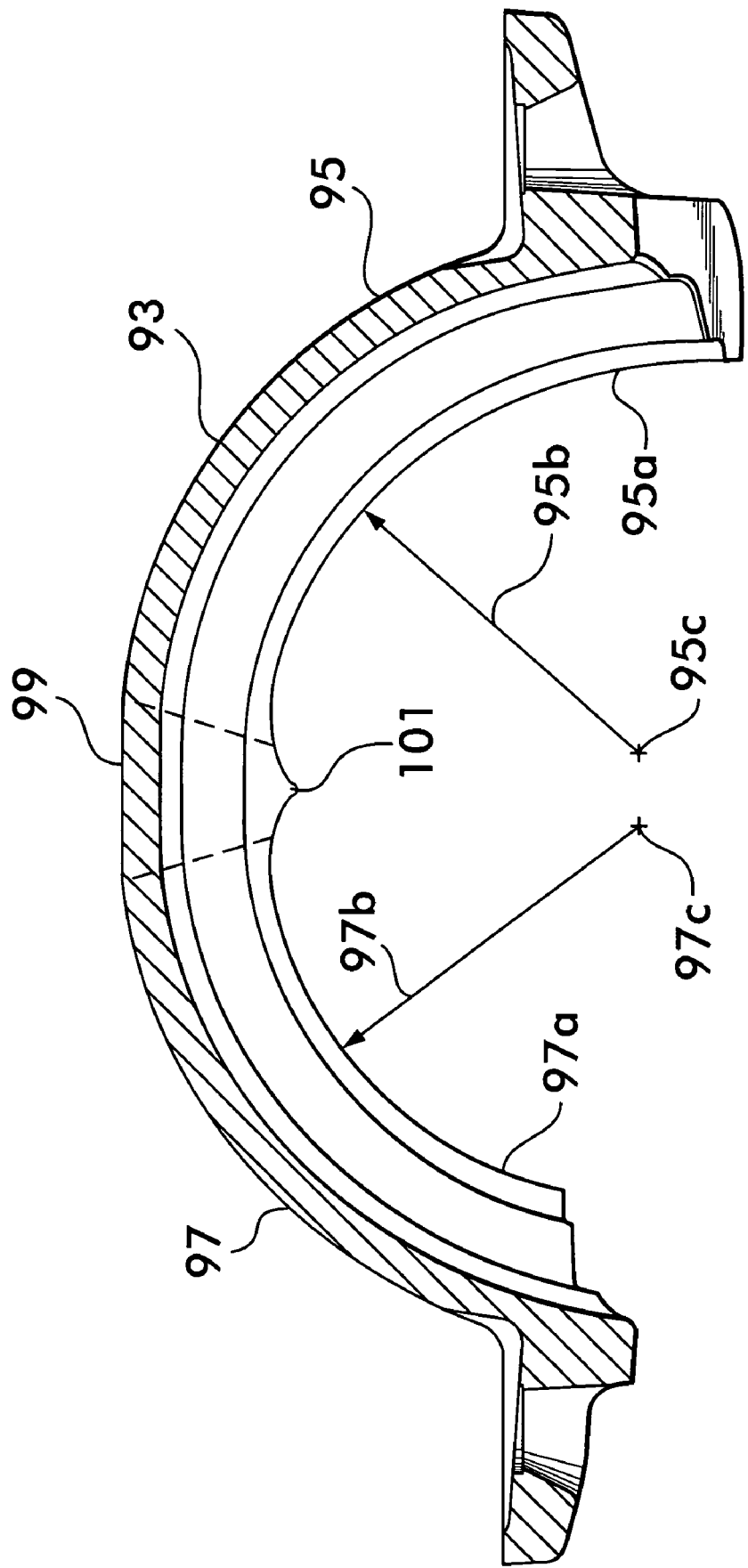

FIG. 3B shows a coupling segment 93 formed of first and second sub-sections 95 and 97. The sub-sections are attached to one another end to end, and each has a respective surface region 95a and 97a with respective radii of curvature 95b and 97b, and respective centers of curvature 95c and 97c. In this embodiment, the surface regions 95a and 97a intersect each other at a point 99 about midway between opposite ends of the segment. The surface regions form a cusp 101 that projects radially inwardly to first engage the outer surface of a pipe element when segment 93 is used to form a pipe joint.

Figure 5:
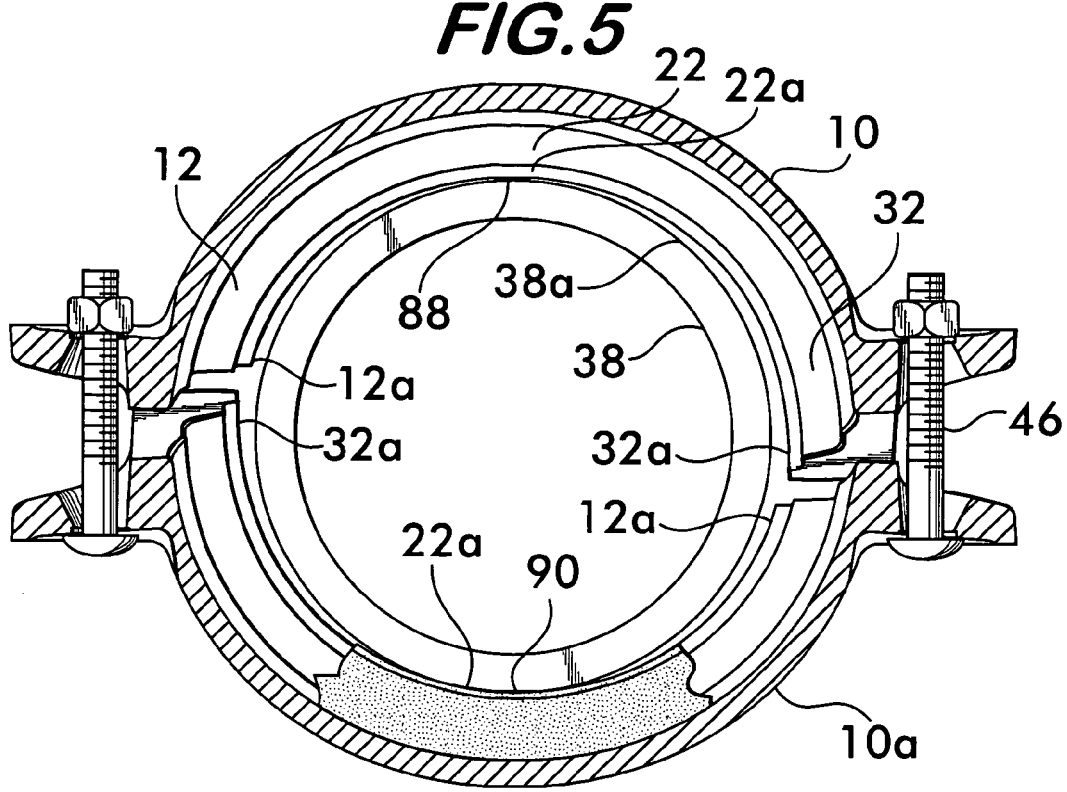
FIGS. 5 and 6 are cross-sectional views that illustrate the installation of the pipe coupling segments according to the invention.

Coupling segment embodiments according to the invention such as 10, 56, 80, 83 and 93 are deformable so as to engage only select portions of certain of the surface regions with the pipe element outer surfaces so as to limit the torque required to tighten the fasteners 46 and produce a mechanical joint with acceptable stiffness axially, in bending and in torsion. As shown by way of example in FIGS. 4, 5 and 6, when the pipe elements 38 and 40 (40 not shown in FIGS. 5 and 6) are inserted within the central space 52 defined by the coupling assembly 48 formed of two segments 10 and 10a, the fasteners 46 are tightened, bringing the coupling segments toward one another. By virtue of their position on the segments, portions of the surface regions 22a on each segment initially contact the pipe elements at respective first contact points 88 and 90 positioned about midway between opposite ends of the segments as shown in FIG. 5. Call point 88 on the upper segment 10 the "12 o'clock" position, and point 90 on the lower segment 10a the "6 o'clock" position.

Figure 6:
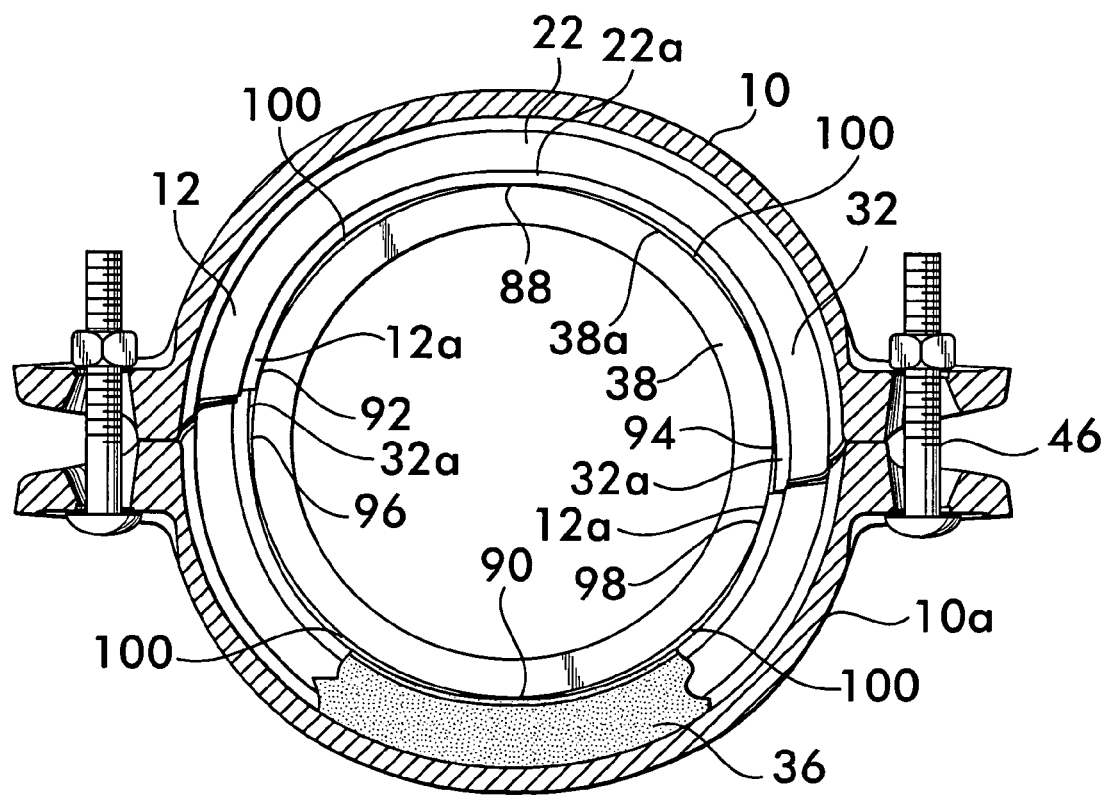

As fasteners 46 are further tightened, the segment 10 deforms by bending around the pipe elements, which are deformed slightly out of round in reaction. The deformation of the pipe elements increases the torsional rigidity of the joint. Portions of the surface regions 12a and 32a on the upper segment 10 next contact the pipe elements at contact points 92 and 94 as shown in FIG. 6. Call points 92 and 94 the "9 o'clock" and "3 o'clock" positions respectively. Similarly, portions of the surface regions 12a and 32a on the lower segment 10a contact the pipe elements at contact points 96 and 98. Call points 96 and 98 the "9 o'clock" and "3 o'clock" positions respectively. For the upper segment 10, those surface regions between 12 o'clock and 9 o'clock and 12 o'clock and 3 o'clock preferably do not make significant contact with the pipe elements, but just touch them. In some situations, a small gap may form between these surface regions and the outer surfaces of the pipe elements as indicated by the gaps 100 illustrated in FIG. 6. Similarly for the lower segment 10a, those surface regions between the 6 o'clock and 9 o'clock and 6 o'clock and 3 o'clock positions preferably do not make significant contact with the pipe elements, but just touch them. Again, in some situations, the surface regions of the lower segment may remain in spaced relation from the pipe element outer surfaces as shown by gaps 100. While ideally, it is desired to have the gaps 100 between the segment surface regions and the pipe outer surfaces be infinitesimally small, for practical purposes it is feasible that the gaps be about 0.001 inches.

By having the segments contact initially at first contact points 88 and 90, and then at second contact points 92, 94, 96 and 98, and preferably at no points in between, the tension forces in the fasteners required to bend and deform the segments remains substantially constant and at a minimum. This occurs because the moment arm between each fastener and the point about which the segments bend (the 12 and 6 o'clock positions), remains substantially constant and at a maximum. If the surface regions were permitted to engage the outer surfaces of the pipe elements progressively around from the 12 and 6 o'clock positions, then the moment arms of the fasteners, measured as the distance between the fastener and the leading edge of the contact patch between the surface regions and the outer surface of the pipe elements, would constantly decrease as more of the surface regions contacted the pipe element outer surface. A decreasing moment arm requires greater force to bend the coupling segment, and hence greater torque is required to be exerted on the fasteners when tightening them to achieve this greater tension. In contrast, for the coupling segments according to the invention, the moment arm to the fastener is substantially unchanging and as large as it can be. Thus, the tension in the fasteners required to deform the segments is substantially minimized, and the torque required to exert this tension force by tightening the fasteners is also minimized for all practical purposes. The various other embodiments 56, 80, 83 and 93 are similar to segment 10 and the description herein applies to them as well.

The bending behavior of the coupling segments such as 10, 56, 80, 83 and 93 as described above, is achieved by designing the curvature of the surface regions according to the following iterative process. First a mathematical model, such as a finite element model, is created that simulates the structural behavior of the coupling segment. The geometry of the model is arranged such that the surface regions at the 12, 3 and 9 o'clock positions contact a circle having a radius equal to the outer radius of the pipe element with which the coupling segment will be used. Next, force is applied to the model at the lug or other connection member while fixing the model at the 12 o'clock position in all degrees of freedom, i.e., bending and translation. The applied force deforms the segment, the force being applied iteratively until there is a circumferential gap between the segment and the circle representing the pipe element. This is the initial estimate of the desired undeformed shape of the coupling segment. The finite element model provides the coordinates of the surface regions, and a computer algorithm is used to fit a curve, also known as a spline, to these coordinates. The finite element model is modified so that it has the coordinates of the spline as the coordinates of the surface regions. Force is then applied to the model that simulates closing of the segment about the pipe element. The segment distorts under the force and the distance between the surface regions and the circle representing the outer surface of the pipe elements is determined. If portions of the surface regions are in contact with the circle, or if portions are too far away, the coordinates of that portion of the surface regions are modified appropriately, a new spline fitting the new coordinates is calculated, the surface regions of the model are modified so that the coordinates of the new spline become the coordinates of the surface regions and the process is repeated until the model predicts that, when deformed by the fasteners, the segment will contact the pipe element at the 12, 3 and 9 o'clock positions and be about 0.001 inches away at points in between. The surface regions at the 12 and 6 o'clock positions may be designed to project inwardly to further enhance the bending effect to bring the 3 and 9 o'clock positions into engagement while maintaining the desired gap between the contact points.

The final curve shape of the surface regions is approximated by a finite number of arcs having different radii of curvature. The surface regions on each segment are preferably interconnected to form a continuous curve. A metal pattern is machined having the shape of the segment including the shape of the surface regions as determined by the iterative method described above and approximated by the finite number of arcs. The metal pattern is then used to create a two-part sand mold which is used to cast segments according to the invention. The segments may be cast from ductile iron as well as other metals. The radii of the arcs that approximate the curve determined by the iterative method become the radii 12b-32b of the surface regions 12a-32a of the segments (analogously, the radii of the arcs become the radii 60b-78b and 84b-86b for the other embodiments).

Although the segments 10, 56 and 80 may be made entirely of sub-sections having curved surface portions, it is found advantageous to include a sub-section having a flat surface portion 102, preferably on the segment such as 22a and 66a that is midway between the ends of the segment as shown in FIGS. 1 and 2. Alternately, as shown in FIG. 3, the sub-section 84 having flat surface portion 102 with sub-sections 82 and 86 having arcuate surfaces of a single radius of curvature on either side is also feasible for certain geometrical situations. However, it is found most advantageous to make the coupling segments 10 having both a flat region and a plurality of sub-sections having different radii.

Couplings according to the invention allow for ease of manual assembly by providing a coupling requiring substantially constant and minimized torque to be applied to the fasteners when effecting a mechanical joint between ends of pipe elements.

What is claimed is:

1. A pipe coupling segment, positionable straddling facing ends of a pair of pipe elements for securing said pipe elements together in end-to-end relationship, wherein said ends of said pipe elements have an outer surface of substantially cylindrical profile, said coupling segment comprising:

a unitary body comprising a plurality of sub-sections positioned end-to-end and defining a circumferential direction, said unitary body further comprising connection members positioned at opposite ends of said unitary body for adjustably connecting said unitary body to a mating unitary body;

each said sub-section having a surface region of a different radius of curvature from an adjacent surface region on an adjacent sub-section, wherein the curvature of said surface regions extends in said circumferential direction; and at least one of said connection members being adjustably tightenable for drawing said unitary body and said mating unitary body toward one another, said unitary body being deformable upon adjustable tightening of said connection member so as to engage said surface regions with the outer surfaces of said pipe elements at a first contact point located about midway between said opposite ends of said unitary body and at second and third contact points located at said opposite ends of said unitary body.

2. A coupling segment according to claim 1, wherein said surface regions between said contact points are in spaced relation away from said outer surfaces of said pipe elements when said contact points engage said outer surfaces of said pipe elements.

3. A coupling segment according to claim 1, wherein said surface region on at least one of said sub-sections has an infinite radius of curvature.

4. A coupling segment according to claim 3, wherein said one sub-section is positioned at a midpoint between said opposite ends of said unitary body.

5. A coupling segment according to claim 4, wherein said surface regions are symmetrically disposed about the midpoint of said unitary body.

6. A coupling segment according to claim 1, wherein said connection members project outwardly from said opposite ends of said unitary body, said connection members being adapted to receive fasteners adjustably joining said connection members to connection members on said mating unitary body, said fasteners being adjustably tightenable for drawing said surface regions of said sub-sections into engagement with said outer surfaces of said pipe elements.

7. A coupling segment according to claim 1, wherein said surface region located midway between said opposite ends of said unitary body projects radially inwardly.

8. A coupling segment according to claim 1, comprising a pair of said surface regions located on opposite sides of a midpoint between said opposite ends of said unitary body, said pair of said surface regions projecting radially inwardly.

9. A coupling segment according to claim 1, wherein two of said surface regions intersect midway between said opposite ends of said unitary body, said surface regions forming a cusp projecting radially inwardly.

10. A coupling segment according to claim 1, wherein said surface regions are interconnected on each said unitary body to form a continuous curve.

11. A pipe coupling assembly for securing pipe elements together in end-to-end relationship, said ends of said pipe elements having an outer surface of substantially cylindrical profile, said coupling assembly comprising:

a plurality of coupling segments connected in end-to-end relationship and positionable straddling facing ends of a pair of said pipe elements, each said coupling segment comprising:

a unitary body comprising a plurality of sub-sections positioned end-to-end and defining a circumferential direction, said unitary body further comprising connection members positioned at opposite ends of said unitary bodies for adjustably connecting said unitary bodies to one another;

each said sub-section having a surface region of a different radius of curvature from said surface region on an adjacent sub-section, wherein the curvature of said surface regions extends in said circumferential direction; and said connection members being adjustably tightenable for drawing said unitary bodies toward one another, said unitary bodies being deformable upon adjustable tightening of at least one of said connection members so as to engage said surface regions with the outer surfaces of said pipe elements at a first contact point located about midway between said opposite ends of said unitary bodies, and at second and third contact points located at said opposite ends of said unitary bodies.

12. A coupling assembly according to claim 11, wherein said surface regions between said contact points are in spaced relation away from said outer surfaces of said pipe elements when said contact points engage said outer surfaces of said pipe elements.

13. A coupling assembly according to claim 11, comprising a pair of said unitary bodies.

14. A coupling assembly according to claim 13, wherein one of said sub-sections has an infinite radius of curvature.

15. A coupling assembly according to claim 14, wherein said one sub-section is positioned at a midpoint between opposite ends of at least one of said unitary bodies.

16. A coupling assembly according to claim 15, wherein said surface regions are symmetrically disposed about the midpoint of at least one of said unitary bodies.

17. A coupling assembly according to claim 13, wherein said connection members project outwardly from said opposite ends of each of said unitary bodies, said projecting connection members being adapted to receive fasteners for adjustably joining said connection members to one another, said fasteners being adjustably tightenable for drawing said surface regions of said sub-sections into engagement with said outer surfaces of said pipe elements.

18. A coupling assembly according to claim 11, wherein the sum of angles subtended by said surface regions with respect to each of said surface region's respective center of curvature on at least one of said unitary bodies is less than 180°, and wherein, when positioned straddling facing ends of said pipe elements, each said surface region has a radius of curvature greater than the radius of curvature of the outer surface of said pipe elements.

19. A coupling assembly according to claim 11, wherein said surface region located midway between said opposite ends of at least of said unitary bodies projects radially inwardly.

20. A coupling assembly according to claim 11, wherein said surface regions are interconnected on each said unitary body to form a continuous curve.

* * * * *